Feb. 26, 1952 D. N. VEDENSKY 2,587,552
PROCESS FOR OBTAINING CHROMIC OXIDE FROM A CHROMATE ORE
Filed May 29, 1951
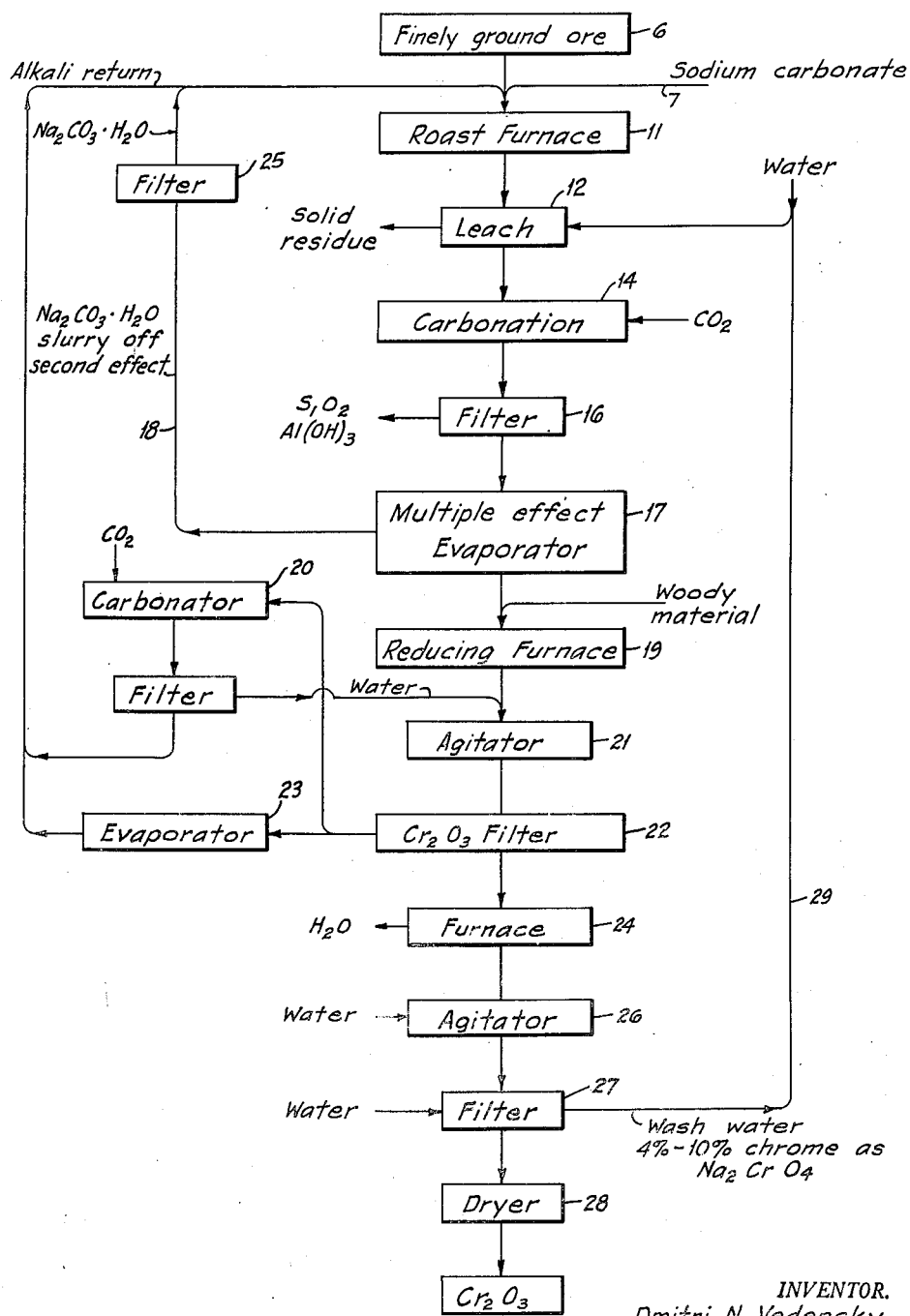
INVENTOR.
Dmitri N. Vedensky
ATTORNEYS Patented Feb. 26, 1952

2,587,552

UNITED STATES PATENT OFFICE 2,587,552

PROCESS FOR OBTAINING CHROMIC OXIDE FROM A CHROMATE ORE

Dmitri N. Vedensky, Berkeley, Calif., assignor to Pacific Bridge Company, a corporation of Delaware Application May 29, 1951, Serial No. 228,927

5 Claims. (Cl. 23—145)

This is a continuation-in-part of application Serial No. 721,426, filed January 10, 1947, now abandoned.

This invention relates to the recovery of chromic oxide from sodium chromate and particularly to the recovery of the chromium content as chromic oxide from a mixture of sodium chromate and sodium carbonate such as may result from the so-called basic roasting of a chromite ore.

In general outline the process of the present invention includes the following:

The chromite ore is roasted with a suitable alkali metal oxide or salt such as sodium carbonate or sodium oxide. An alkaline earth material such as calcium carbonate or lime may also be used in the basic roast. The roasted material is removed from the furnace and is leached with water to remove the water soluble constituents and separated from the solid, insoluble residue. The resulting liquor, free from the residue, is then carbonated to precipitate the calcium as $CaCO_3$ and to cause the silica and aluminum hydroxide to precipitate. The liquor is then filtered. The clear filtrate contains sodium carbonate and sodium chromate and it has been usual heretofore to evaporate this to provide a dry mixture of sodium carbonate and sodium chromate. This mixture is then reduced in a suitable furnace, the sodium chromate being converted to the oxide. The sodium carbonate and sodium hydroxide are removed from the oxide by water leaching. This process is thus suited to the recovery from a chrome ore of the chromium content as chromic oxide of a relatively pure quality.

This complete process and operation, while generally suitable, is subject to certain operating difficulties and includes certain operating inefficiencies which I will point out hereinafter and which I have also been able either to eliminate entirely or reduce very considerably whereby the overall operation is materially improved.

The actual and prospective sodium carbonate content of the roasted material may be relatively high for excess soda is usually employed in the roast. In addition, one reaction which occurs during carbonation can be represented as:

$$2NaAlO_2 + CO_2 + 3H_2O \rightarrow 2Al(OH)_3 + Na_2CO_3$$

It is evident that the more sodium aluminate is present in the chromate solution prior to carbonation, the more sodium carbonate will be present in carbonated solution after filtration of $Al(OH)_3$ precipitate.

When the filtrate from the leaching operation is evaporated to dryness, the sodium carbonate forms a salt mixture with the sodium chromate. The presence of the sodium carbonate during the evaporation presents a problem because it may form a hard crust of anhydrous sodium carbonate on the evaporator surfaces and thus reduce heat transfer. Also, the presence of sodium carbonate with sodium chromate is objectionable because, when the latter is reduced to oxide and then leached to remove the hydroxide and carbonate, the oxide (a) occludes these and (b) the alkali causes the oxide to revert to chromate. It is therefore highly advantageous to remove from the solution undergoing evaporation at least some of the sodium carbonate present, thereby reducing the sodium carbonate content of the final mixed salt. In addition, the separated carbonate can be returned for re-use in the roast, thereby improving the efficiency of the operation.

I have found that if the temperature of the solution during at least the latter portion of the evaporation is kept below 116° C., the sodium carbonate salts out of the liquor undergoing evaporation as sodium carbonate monohydrate and can be removed as a slurry in a small portion of the liquor. By so removing the sodium carbonate, one obtains finally a sodium chromate solution substantially free of sodium carbonate; in practice I have removed better than 90% of the carbonate before crystallizing any sodium chromate. This solution is then evaporated in another evaporator or in another evaporator effect at a temperature above that at which $Na_2CrO_4 \cdot 4H_2O$ can exist or crystallizes. The evaporation is continued and the anhydrous sodium chromate crystallizes out of the solution, when the solution contains 56% of sodium chromate. At this density the boiling point is 117° C.; the solution is therefore evaporated at a temperature above 117° C., usually about 120° C.

I have found it of advantage to recover the sodium chromate from the evaporator as the anhydrous salt for several reasons: If the sodium chromate containing water of crystallization is utilized in the reducing furnace, the salt melts in the water of crystallization making operation of the furnace difficult if not impossible; if one attempts to dry the sodium chromate containing water of crystallization, the operation is hazardous and expensive because chromate dust is extremely toxic to humans. By evaporating the sodium chromate solution at a final temperature of 117° C., or above, the anhydrous form is assured. One can use either a single effect or a multiple effect evaporation, the sodium carbonate usually being taken off the effect preceding the final effect in a multiple effect evaporator.

When anhydrous sodium chromate is reduced in a furnace with hydrogen, the charge becomes sticky and is removed from the furnace only with difficulty. Even when removed from the furnace, the chromic oxide exhibits such a property to occlude alkali in that the latter cannot be removed by water leaching. Since the oxide is produced in the presence of sodium carbonate and sodium hydroxide, as is indicated by the following:

$4Na_2CrO_4 + 3C + H_2O \rightarrow 2Cr_2O_3 + 3Na_2CO_3 + 2NaOH$ the alkali occlusion is a serious failing for, when the oxide is again heated, the alkali present and which cannot be removed by water leaching, recombines with the oxide to form sodium chromate; I have observed as much as one-fourth of the oxide reverting to sodium chromate under the described conditions.

To overcome the occlusion of excessive amount of alkali and to improve reduction of the chromate to oxide, I have investigated a number of reducing agents which can be added to the charge of sodium chromate. Such an agent, in addition to being inexpensive, should also introduce a minimum of diluent, otherwise a low-grade product may result, or the product may be contaminated and unsuitable for further use; e. g., sulfur is an unsuitable reductant.

I have found that if one first incorporates into the mixture added to the reducing furnace from about 9% to 30% by weight of a suitable woody material such as sawdust, wood chips, wood flour or the like, upon the subsequent reduction with hydrogen or equivalent reducing agent, the charge becomes loose and free-flowing. Individual particles in such a charge are granular, like sugar passing freely through the furnace without sticking to the walls. In addition, the resulting chromic oxide shows less tendency to occlude alkali, the chrome equivalent of alkali retained after washing being reduced from 25% to less than 10% by weight.

One can use as little as 9% of the woody material, but generally the more woody material is used, the better the results, although beyond 30% little effect is evident. About 18%, on the average, gave good results.

I have tried various other materials, such as coal, petroleum coke, charcoal, dextrine, starch, etc.; the latter two did not prevent sticking. Coal and charcoal prevented sticking when the initial charge was entirely dry, but not when wet, unless a large excess was used. Woody material, such as sawdust, can be used on the slightly wet salt mixture coming from the evaporator, because woody material is an excellent absorbent for water.

When excess carbon or an excess of woody material over that required stoichiometrically for reduction is used, the charge, after the removal of alkali by water leaching, contains residual carbon and carbon compounds. These have to be eliminated by ignition of the washed oxide; when woody material is used instead of carbon, the carbon elimination is almost complete. This factor is of extreme importance if the chromic oxide is to be subsequently used in production of steels. Igniting chromic oxide produced in this manner in a 4-hearth Herreschoff furnace 6 feet in diameter, I have obtained chromic oxide of exceptionally low carbon content—0.01% C. and entirely free from sulfur; this is an ideal product for use in stainless steel manufacture and for other applications requiring a relatively pure chromic oxide.

I have also found that when chromic oxide is washed or leached with water to remove the alkali present, the wet mixture should be carbonated for the occluding property of the oxide is reduced; apparently the oxide has a reduced ability to occlude alkali in the presence of a carbonate or less ability to occlude sodium carbonate as compared to sodium hydroxide.

It is in general the broad object of the present invention to provide a novel and useful process for converting a chrome ore to a high grade chrome oxide.

Another object of the present invention is to provide a novel and useful process for evaporating a sodium chromate-sodium carbonate solution.

Another object of the present invention is to provide a novel and useful process for reducing a sodium chromate-sodium carbonate mixture to chromic oxide.

Another object of the present invention is to provide a novel and useful process for removing alkali from chrome oxide.

Another object of the present invention is to provide a novel and useful process for removing residual excess carbon and carbon compounds from chromic oxide.

The invention includes other objects and features of advantage some of which, together with the foregoing, will appear hereinafter wherein a preferred illustrative example is set forth. The drawing is a flow sheet illustrating diagrammatically the complete process.

Referring to the drawing, a charge 6 of a finely ground chrome ore is mixed with a suitable quantity of an alkali, e. g., sodium carbonate 7; lime or other alkaline earth material may also be included. This mixture is then roasted in a suitable furnace 11. The roast is then leached as at 12 with water; the solid residue is removed and the aqueous solution of sodium chromate, alkali carbonate and hydroxide are then carbonated with $CO_2$ as at 14 to precipitate $SiO_2$ and $Al(OH)_3$. The precipitate is then removed in filter 16. The filtrate is evaporated in evaporator 16, a portion of the sodium carbonate being removed through line 18 as a sodium carbonate monohydrate slurry. This is filtered as at 25; the carbonate filter cake can be returned to a fresh roast. One can use a single, double or triple effect evaporator. In any case, before the anhydrous sodium chromate is recovered, the solution is rendered substantially free of sodium carbonate by evaporating at a temperature whereat the sodium carbonate salts out as the monohydrate. Thereafter, the solution is heated further and its temperature raised to above 117° C. to salt out sodium chromate as the anhydrous salt.

The anhydrous sodium chromate is removed from the evaporator. If reduction to the oxide is desired, the mixture from the evaporator is mixed with about 18% sawdust and then reduced in furnace 19. The residue from the reducing furnace is then leached with water, as in agitator 21. The mixture is then filtered in filter 22, the filtrate and wash liquor being evaporated in evaporator 23 and the resulting alkali returned to the roast. As an alternative, the filtrate can be carbonated in carbonator 20 to form sodium bicarbonate which is separated and re-used in the roast. The alkaline water can be re-used.

The remaining chromic oxide is roasted on a small hearth furnace 24 under suitable conditions to drive off water and burn off carbon. Any chromate formed in this heating is washed in agitator 26, filtered on filter 27, the wash water, containing sodium chromate (usually 4%–10% chrome as $Na_2CrO_4$), is returned by line 29 to the roast leach at 12. The carbon-chromate free oxide is then passed through a dryer 28, the final product being recovered as the oxide $Cr_2O_3$.

The following is set forth as illustrating the practice of the present invention.

A charge of 100 pounds of finely ground ore of the following composition was mixed with 40 pounds of sodium carbonate and the mixture heated in a roasting furnace to a temperature of 900° C.

Ore analysis

| | Percent |
|---|---|
| $Cl_2O_3$ | 33 |
| $Al_2O_3$ | 29 |
| $SiO_2$ | 6 |
| FeO | 15 |
| MgO | 16 |

The roast was then leached with 225 pounds of water and the residue roasted with 50 pounds of sodium carbonate. The leach liquor was separated and then carbonated with sufficient carbon dioxide to precipitate the silica and aluminate present, the precipitate being removed on a filter. The filtrate was then subjected to evaporation; the solution boiled initially at 80° C. under partial vacuum. After the evaporation had continued for some time, sodium carbonate monohydrate salted out and was removed from the solution continuously until 94% of the sodium had been removed. The evaporation was continued with a rise in boiling point until anhydrous sodium chromate salted out of the 56% mother liquor and was removed.

To illustrate the reduction of the sodium chromate, 100 pounds of sodium chromate, obtained by the above process, were mixed with 20 pounds of sawdust and heated in a furnace in a reducing atmosphere. The reaction is exothermic and is complete in a few minutes. The reduced sodium chromate was leached with water and filtered to separate the alkali present in the chromic oxide. The remaining oxide was then again heated in a furnace under oxidizing conditions to drive off water and burn any residual carbon remaining after the reduction. The heated material was then washed and dried, 42 pounds of chromic oxide having the following analysis was secured:

| | Percent |
|---|---|
| $Cr_2O_3$ | 98 |
| C | .01 |

From the foregoing, I believe it will be apparent that I have provided a relatively novel and simple process for producing sodium chromate and particularly for separating sodium chromate from a solution also containing sodium carbonate. It is only necessary to evaporate the sodium carbonate-sodium chromate solution at a temperature below 116° C., removing the sodium carbonate monohydrate as this forms a solid phase in the solution undergoing evaporation. When substantially all of the sodium carbonate monohydrate has salted out and has been removed, the temperature is increased to above 116° C. and the evaporation continued whereupon sodium chromate salts out as an anhydrous solid phase. The evaporation can be carried on, as has been indicated, in a single, double or triple effect evaporator. The process can be carried on as a batch operation or as a continuous operation. The temperatures given are those which obtain at atmospheric pressure. Obviously, lower temperatures may be used if the operation is carried on under a reduced pressure, as is usually the case in multiple effect evaporators.

I claim:

1. A process for concentrating an aqueous sodium chromate-sodium carbonate solution such as may result from leaching of an alkali chrome ore roast, the process comprising evaporating said solution at a temperature below 116° C. and removing sodium carbonate monohydrate, salting out during the evaporation until the solution is substantially free of sodium carbonate, and then continuing the evaporation at a temperature above 116° C. to salt out anhydrous sodium chromate substantially free of sodium carbonate.

2. A process for separating sodium carbonate and sodium chromate in aqueous solution comprising continuously evaporating the solution at a temperature below 116° C. to salt out solid sodium carbonate monohydrate from the solution, separating the solid sodium carbonate monohydrate from the solution, continuing the evaporation until substantially only a sodium chromate solution remains, and continuing the evaporation to salt out an anhydrous sodium chromate solid phase from such solution.

3. A process for separating sodium carbonate and sodium chromate in aqueous solution comprising continuously evaporating the solution in a multiple effect evaporator including at least three effects to salt out solid sodium carbonate monohydrate from the solution in the second effect at a temperature below 116° C., separating the solid sodium carbonate monohydrate from the solution, continuing the evaporation in the third effect to salt out anhydrous sodium chromate from such solution.

4. A process for recovering sodium chromate from an aqueous solution containing sodium chromate and sodium carbonate comprising evaporating an aqueous solution of sodium carbonate and sodium chromate at a temperature below about 116° C. to salt out sodium carbonate monohydrate as a solid phase, removing the sodium carbonate monohydrate solid phase until substantially only sodium chromate remains in the solution and continuing the evaporation at a temperature above about 117° C. to salt out as a solid phase anhydrous sodium chromate, and recovering the anhydrous sodium chromate solid phase.

5. A process for producing chromic oxide from a chrome ore comprising roasting the ore with sodium carbonate, leaching the roasted ore to provide a sodium chromate solution containing sodium carbonate, carbonating the solution to convert soluble sodium silicate and aluminate to insoluble silica and aluminum hydroxide and soluble sodium carbonate, filtering off the silica and aluminum hydroxide, evaporating the filtrate in an evaporator at a temperature below 116° C. while reducing the sodium carbonate content of the final dry sodium carbonate-sodium chromate mixture by removing from the evaporator sodium carbonate monohydrate salting out in the evaporator until substantially only a sodium chromate solution remains, continuing the evaporation of said solution at a temperature above 116° C. to salt out anhydrous sodium chromate, recovering substantially dry crystallized sodium chromate with substantially reduced sodium carbonate content from the evaporator, mixing the dry sodium chromate with about 9% to 30% of a dry, finely divided woody material selected from the group consisting of sawdust, wood chips and wood flour, heating the mixture under dry reducing conditions to convert the sodium chromate to chromic oxide, washing the oxide with water to remove sodium hydroxide, heating the oxide under oxidizing conditions to remove residual carbon and convert remaining sodium hydroxide present to chromate, and washing and drying the oxide.

DMITRI N. VEDENSKY.

No references cited.